(12) United States Patent
Dorovsky

(10) Patent No.: US 9,200,507 B2
(45) Date of Patent: Dec. 1, 2015

(54) DETERMINING FRACTURE LENGTH VIA RESONANCE

(71) Applicant: Vitaly N. Dorovsky, Novosibirsk (RU)

(72) Inventor: Vitaly N. Dorovsky, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 385 days.

(21) Appl. No.: 13/745,232

(22) Filed: Jan. 18, 2013

(65) Prior Publication Data

US 2014/0202687 A1 Jul. 24, 2014

(51) Int. Cl.
*E21B 47/00* (2012.01)
*E21B 43/26* (2006.01)
*G01V 1/44* (2006.01)

(52) U.S. Cl.
CPC ............. *E21B 47/00* (2013.01); *E21B 43/26* (2013.01); *G01V 1/44* (2013.01)

(58) Field of Classification Search
CPC .................................. E21B 43/26; E21B 47/00
See application file for complete search history.

(56) References Cited

U.S. PATENT DOCUMENTS

| | | | |
|---|---|---|---|
| 4,432,078 A | 2/1984 | Silverman | |
| 4,783,769 A | 11/1988 | Holzhausen | |
| 4,953,137 A | 8/1990 | Medlin | |
| 5,010,527 A | 4/1991 | Mahrer | |
| 5,206,836 A | 4/1993 | Holzhausen et al. | |
| 6,724,687 B1 * | 4/2004 | Stephenson et al. | 367/32 |
| 6,814,141 B2 | 11/2004 | Huh et al. | |
| 7,357,030 B2 | 4/2008 | Novascone et al. | |
| 7,966,874 B2 | 6/2011 | Hassan et al. | |
| 8,297,354 B2 | 10/2012 | Ayan et al. | |
| 2003/0042018 A1 * | 3/2003 | Huh et al. | 166/249 |
| 2003/0192689 A1 | 10/2003 | Moake et al. | |
| 2009/0179649 A1 | 7/2009 | Schmidt et al. | |
| 2012/0111560 A1 | 5/2012 | Hill et al. | |
| 2012/0279713 A1 | 11/2012 | Leon et al. | |
| 2013/0273191 A1 | 10/2013 | Dooley | |

FOREIGN PATENT DOCUMENTS

WO 2009032996 A2 3/2009

OTHER PUBLICATIONS

International Search Report and Written Opinion, International Application No. PCT/US2013/074963, Date of Mailing Apr. 9, 2014, Korean Intellectual Property Office, International Search Report 5 pages, Written Opinion 4 pages.

Hietanen et al., "A Helmholtz resonator model for an electrostatic ultrasonic air transducer with a V-grooved backplate", Sensors and Actuators A, 39 (1993) pp. 129-132.

* cited by examiner

*Primary Examiner* — William P Neuder
(74) *Attorney, Agent, or Firm* — Cantor Colburn LLP

(57) ABSTRACT

A system and method to determine a length of a fracture induced from a borehole are described. The method includes isolating a portion of the borehole, the portion of the borehole including an end of the fracture at the borehole wall, increasing fluid pressure in the portion of the borehole, deploying a low-frequency source in the portion of the borehole, and varying a frequency of the low-frequency source to generate resonance oscillations at a resonance frequency in the fracture. The method also includes determining the length of the fracture based on the resonance frequency.

13 Claims, 3 Drawing Sheets

DETERMINING FRACTURE LENGTH VIA RESONANCE

BACKGROUND

Hydraulic fracturing involves inducing fractures in a rock layer using a pressurized fluid. Energy from the injection of highly pressurized hydraulic fluid creates new channels in the rock. The fractures propagate out from a borehole (from which they are induced) and may be used to release natural gas and petroleum, for example. However, in a hydraulic fracturing process, the characteristics of the resulting fracture are unpredictable and not readily discernible even after completion of the process.

SUMMARY

According to one aspect of the invention, a method of determining a length of a fracture induced from a borehole includes isolating a portion of the borehole, the portion of the borehole including an end of the fracture at the borehole wall; increasing fluid pressure in the portion of the borehole; deploying a low-frequency source in the portion of the borehole; varying a frequency of the low-frequency source to generate resonance oscillations at a resonance frequency in the fracture; and determining the length of the fracture based on the resonance frequency.

According to another aspect of the invention, a system to determine a length of a fracture induced from a borehole includes packers disposed to isolate a portion of the borehole that includes an end of the fracture at the borehole wall; a piston deployed in a pipe coupled to a packer, the piston movement increasing fluid pressure in the portion of the borehole; a low-frequency source deployed in the portion of the borehole, the low-frequency source generating resonance oscillations at a resonance frequency in the fracture; and a processor configured to determine the length of the fracture based on the resonance frequency.

BRIEF DESCRIPTION OF THE DRAWINGS

Referring now to the drawings wherein like elements are numbered alike in the several Figures.

DETAILED DESCRIPTION

Embodiments of the invention described herein may be used to determine the length of a fracture as a radial distance from the axis of the borehole used to induce the fracture.

Figure 1:
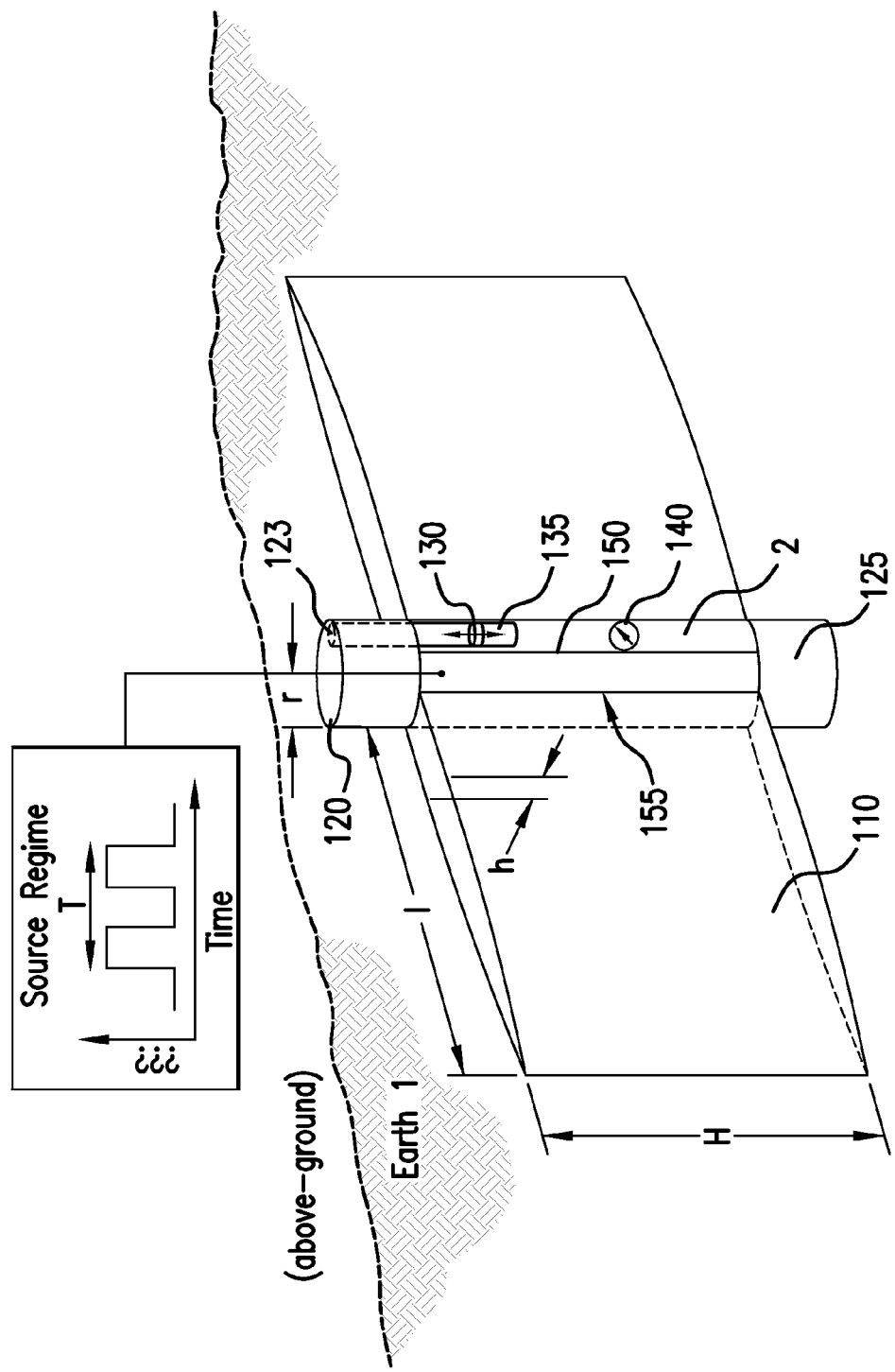
FIG. 1 depicts a system to find the length of a fracture according to an embodiment of the invention.

FIG. 1 depicts a system to find the length of a fracture according to an embodiment of the invention. A fracture is induced from a borehole 2 penetrating the earth 1. The fracture begins at the intersection with the boundary of the borehole 2 and expands in three dimensions into the wing of the fracture 110 shown in FIG. 1. The packers 120, 125 are used to isolate a portion of the borehole 2 between the two packers 120, 125 so that the portion of the borehole 2 may act as a cylindrical resonator. The portion of the borehole 2 isolated by the packers 120, 125 includes the end of the fracture that intersects the borehole 2 boundary which expands into the wing of the fracture 110. The packer 120 is equipped with a cylindrical pipe 135 that includes a piston 130 moving inside it. In the embodiment shown in FIG. 1, the pipe 135 is positioned within the packer 120 such that, when the piston 130 is at its extreme top position inside the pipe 135, the bottom of the piston 130 coincides with the bottom of the packer 120. Fluid pressure in the isolated portion of the borehole 2 is elevated to a pressure that causes the fracture to slightly open and elongate (the fluid being the fluid that had been used in the hydraulic fracturing). A pressure sensor 140 measures the pressure in the isolated portion of the borehole 2.

The resonance system is then generated in the following way. The movement of the piston 130 inside the pipe 135 forces fluid flow into the fracture and ensures additional filing of the fracture due to the elongation of the fracture in the process of expansion. The fluid entering the fracture props up the ceiling of the fracture and causes elastic deformation, thereby increasing the volume of the fracture and also storing energy in the elastic deformation field. When fluid propagation reaches its limit, the fluid stops and begins reverse movement back into the isolated portion of the borehole 2 due to the elastic field resulting from the elastic deformation. Because the fluid opens up more of the fracture as the piston initially increases fluid pressure into the fracture, more fluid is needed to fill the isolated portion of the borehole 2 after this process. This additional fluid is introduced through the inlet/outlet valve 123. When the reverse movement of the fluid results in the piston reaching its extreme top position, subsequent fluid movement takes place inside the isolated portion of the borehole 2 due to inertia of the fluid volume. The fluid undergoing elastic compression is similar to the air compression cycle in a Helmholtz resonator. When all fluid movement inside the isolated portion of the borehole 2 stops, the process repeats itself in reverse. The varying volume of the fracture based on the inflow and outflow of fluid (opening up and then collapsing areas of the fracture) generates parametric oscillations as discussed below with reference to a source 150 of oscillations in a cylinder 155. The parameter being modulated by the piston 130 movement to provide the parametric oscillations is the volume.

Figure 2:
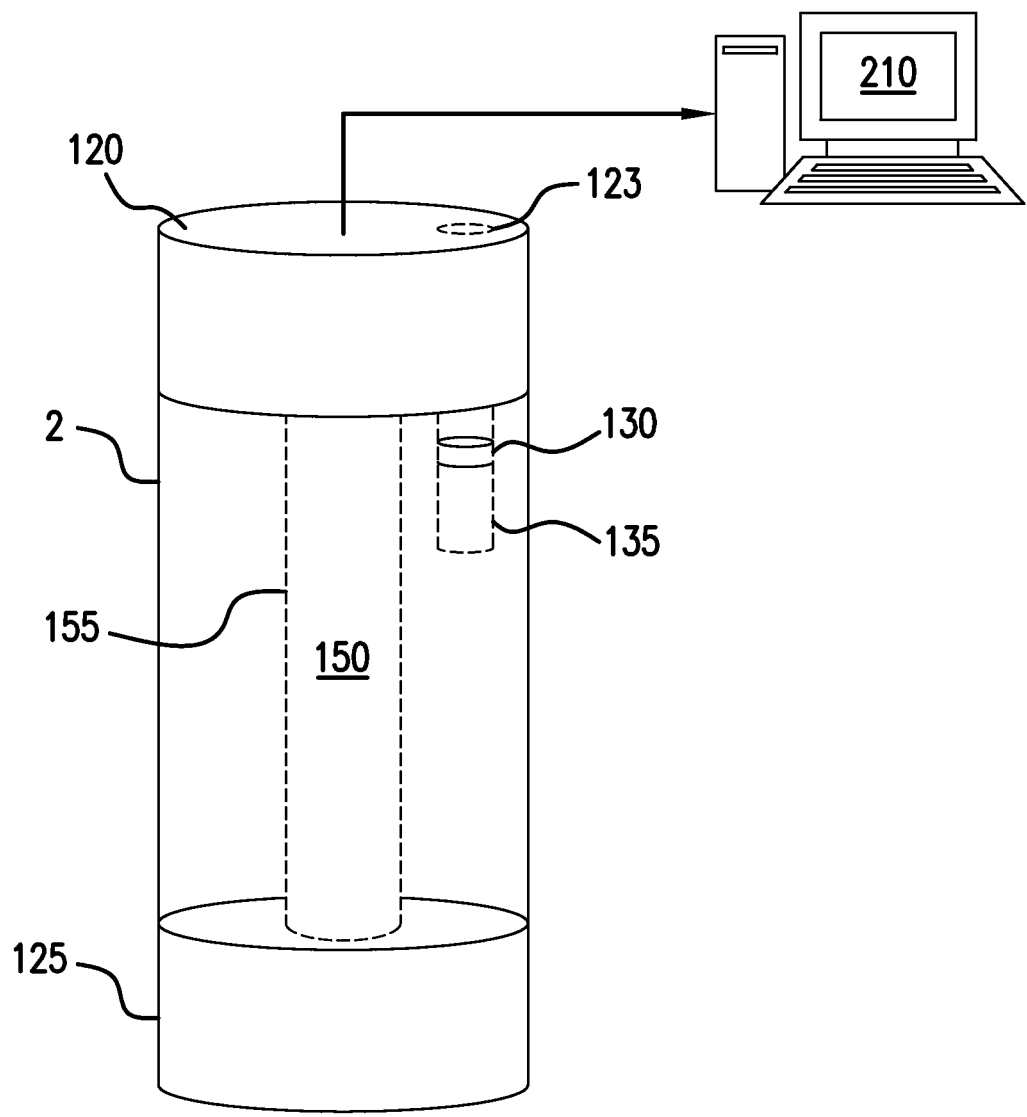
FIG. 2 details the isolated portion of the borehole according to an embodiment of the invention.

FIG. 2 details the isolated portion of the borehole 2 according to an embodiment of the invention. For parametric excitation of the system, a source 150 of radial low-frequency oscillations (e.g., acoustic generator) is placed in the center of a cylinder 150 in the resonator (the resonator being created by the isolated portion of the borehole 2). The source 150 may operate in a pulsed mode emitting short hydraulic pulses of a certain duration and frequency in the presence of constant pressure. The source 150 may be formed by a second piston creating vibrations in the cylinder 155. By varying the pulse frequency (frequency of the periodic oscillations), the system is excited parametrically. The parametric resonance has an excitation threshold with respect to the amplitude of the oscillations, which is determined by the Q-factor of the system, where the Q-factor is a measure of how under-damped the resonator is. The higher the Q-factor, which may be determined theoretically, the lower the excitation threshold (lower oscillation amplitude needed). To boost the Q-factor, fluids with minimal viscosity may be used in the isolated portion of the borehole 2 (resonator). Based on the piston movement and the low-frequency source, a parametric system of resonance oscillations with an eigenfrequency $\omega$ is created. By measuring the resonance frequency, the relationship between the eigenfrequency $\omega$ of the system and several factors that include fracture length may be used to determine the length of the non-perturbed fracture in the following way. The eigenfrequency $\omega$ of the system is determined univalently (on a one-to-one basis) by the fracture length, volume of the isolated portion of the borehole 2, velocity of sound in the fluid, transverse cross-section of the fracture, and elastic moduli of the medium (related to viscosity). On the whole, the system has distributed degrees of freedom. Dependence of the eigenfrequency ω of the system on the fracture length and other parameters may be found theoretically. Further, resonance frequency (R) (related to eigenfrequency ω) may be measured, volume of the isolated portion of the borehole 2 (A) may be determined from the borehole 2 diameter, transverse cross-section of the fracture (B) (width of the fracture at the side of the borehole 2) is known, and viscosity of the fluid which is related to the elastic moduli of the medium (C) is known. Thus, fracture length may then be determined based on the theoretically developed relationship. That is, $$R = \text{function}(\text{fracture length}, A, B, C) \quad [\text{EQ. 1}]$$

By knowing or measuring R, A, B, and C, the fracture length may be determined from EQ. 1. The processing to determine fracture length may be performed by a surface processing system 220 that includes one or more processors and one or more memory devices.

Figure 3:
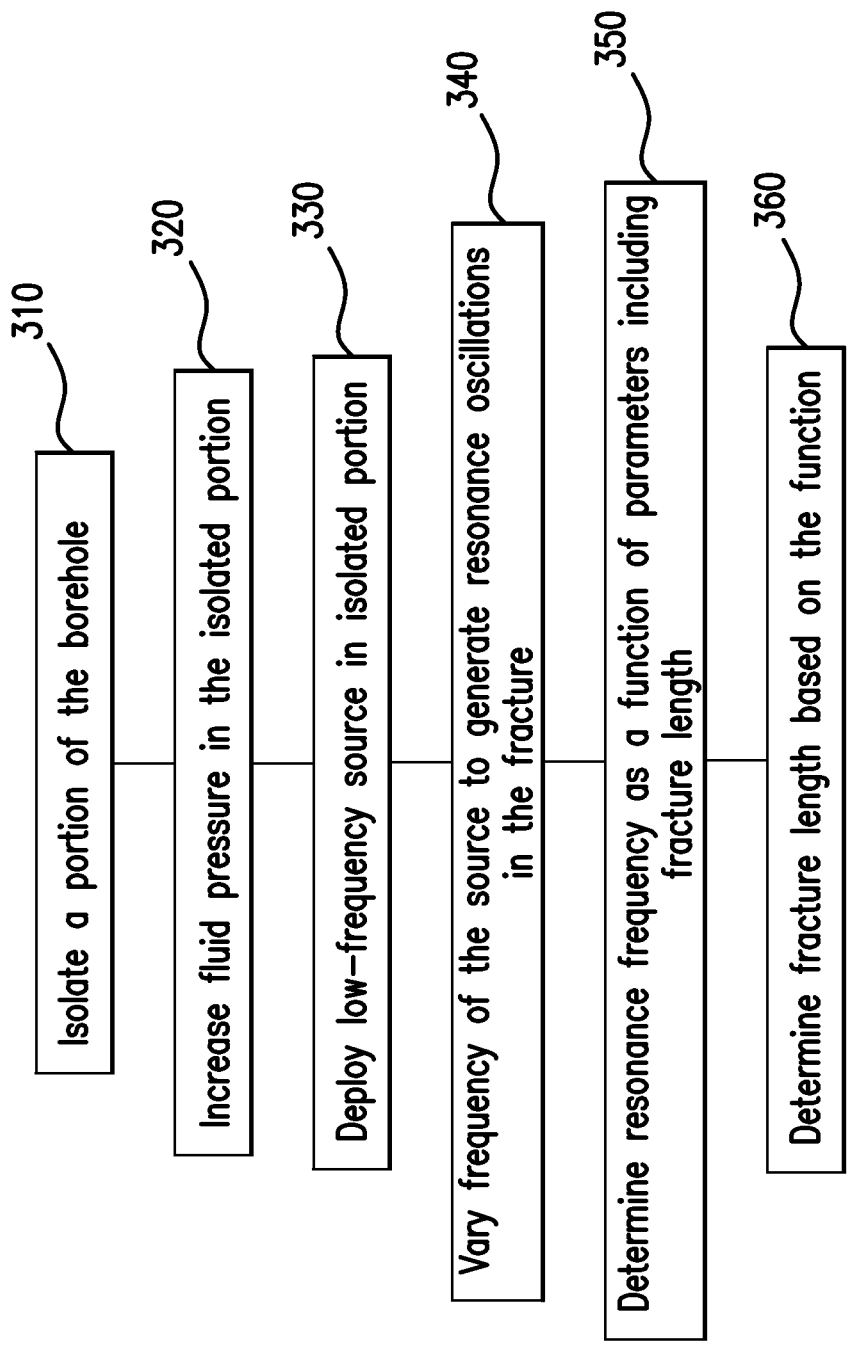
FIG. 3 is a flow diagram of a method of determining a length of a fracture according to an embodiment of the invention.

FIG. 3 is a flow diagram of a method of determining a length of a fracture according to an embodiment of the invention. Isolating a portion of the borehole 2 (block 310) may include positioning the packers 120, 125 as shown in FIGS. 1 and 2, for example. The isolated portion is ensured to include the start of the fraction at the wall of the borehole 2. Increasing fluid pressure in the isolated portion (block 320) may be through the piston 130 movement as described above. At block 330, the method includes deploying a low-frequency source in the isolated portion and at block 340, the method includes varying the frequency of the source (exciting the system parametrically) at constant pressure to generate resonance oscillations in the fracture. Determining the resonance frequency as a function of parameters including fracture length (block 350) may be done theoretically, as described above with reference to EQ 1. At block 360, the method includes determining fracture length based on the function.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method of determining a length of a fracture induced from a borehole, the method comprising:
    isolating a portion of the borehole, the portion of the borehole including an end of the fracture at the borehole wall;
    increasing fluid pressure in the portion of the borehole;
    deploying a low-frequency source in the portion of the borehole;
    varying a frequency of the low-frequency source to generate resonance oscillations at a resonance frequency in the fracture; and
    determining the length of the fracture based on the resonance frequency;
    wherein the increasing fluid pressure is by movement of a piston within a pipe in the portion of the borehole.

2. The method according to claim 1, wherein the isolating the portion of the borehole includes positioning packers above and below the portion of the borehole.

3. The method according to claim 1, wherein the increasing fluid pressure causes the fracture to open and elongate.

4. The method according to claim 1, wherein the increasing fluid pressure begins a cycle of fluid movement into and out of the fracture.

5. The method according to claim 1, further comprising determining the resonance frequency as a function of parameters including the length of the fracture.

6. The method according to claim 5, wherein the resonance frequency is theoretically determined as a function of volume of the portion of the borehole, transverse cross-section of the fracture, viscosity of the fluid, and the length of the fracture.

7. The method according to claim 6, wherein the resonance frequency is measured, the volume of the portion of the borehole, the transverse cross-section of the fracture, and the viscosity of the fluid are known, and the length of the fracture is determined based on the function.

8. A system to determine a length of a fracture induced from a borehole, the system comprising:
    packers disposed to isolate a portion of the borehole that includes an end of the fracture at the borehole wall;
    a piston deployed in a pipe coupled to a packer, the piston movement increasing fluid pressure in the portion of the borehole;
    a low-frequency source deployed in the portion of the borehole, the low-frequency source generating resonance oscillations at a resonance frequency in the fracture; and
    a processor configured to determine the length of the fracture based on the resonance frequency.

9. The system according to claim 8, wherein the piston increasing the fluid pressure causes the fracture to open and elongate.

10. The system according to claim 8, wherein the piston movement corresponds with a cycle of fluid movement into and out of the fracture.

11. The system according to claim 8, wherein the processor determines the resonance frequency as a function of parameters including the length of the fracture.

12. The system according to claim 11, wherein the processor theoretically determines the resonance frequency as a function of volume of the portion of the borehole, transverse cross-section of the fracture, viscosity of the fluid, and the length of the fracture.

13. The system according to claim 12, wherein the resonance frequency is measured, the volume of the portion of the borehole, the transverse cross-section of the fracture, and the viscosity of the fluid are known, and the processor determines the length of the fracture based on the function.

* * * * *